US006052896A

United States Patent [19]

Howell, III et al.

[11] Patent Number: 6,052,896

[45] Date of Patent: Apr. 25, 2000

[54] METHOD OF INSTALLING AN OIL PAN HEATER ON AN OIL PAN MOUNTED ON AN ENGINE BLOCK

[75] Inventors: Edward H. Howell, III, Wheaton; Roger E. Porter, Villa Park, both of Ill.

[73] Assignee: Navistar International Transportation Corp.

[21] Appl. No.: 09/134,876

[22] Filed: Aug. 15, 1998

[51] Int. Cl.[7] ....... B23P 15/00

[52] U.S. Cl. ....... 29/888.011; 29/428; 29/402.08; 29/888.01

[58] Field of Search ....... 29/888.011, 888.01, 29/428, 40.08, 402.03

[56] References Cited

U.S. PATENT DOCUMENTS

| | | |
|---|---|---|
| D. 341,142 | 11/1993 | Rogers et al. . |
| 1,509,327 | 9/1924 | Winchester . |
| 1,816,004 | 7/1931 | Collier . |
| 2,562,019 | 7/1951 | Colley . |
| 2,562,336 | 7/1951 | Selden . |
| 2,763,314 | 9/1956 | Gill . |
| 3,119,177 | 1/1964 | Knecht . |
| 3,304,830 | 2/1967 | Shackelford . |
| 4,205,758 | 6/1980 | Johnson . |
| 4,411,458 | 10/1983 | Strunk . |
| 4,708,556 | 11/1987 | Pamer et al. . |
| 4,807,847 | 2/1989 | Martz . |
| 5,107,808 | 4/1992 | Mahn et al. . |
| 5,197,567 | 3/1993 | Rabalais . |
| 5,199,331 | 4/1993 | Tsukamoto . |
| 5,547,042 | 8/1996 | Platt . |
| 5,655,280 | 8/1997 | McCommon . |

FOREIGN PATENT DOCUMENTS

| | | |
|---|---|---|
| 1094042 | 11/1953 | France . |
| 3009 079 | 11/1980 | Germany . |

*Primary Examiner*—Irene Cuda
*Attorney, Agent, or Firm*—Dennis Kelly Sullivan; Jeffrey P. Calfa

[57] ABSTRACT

A method is provided for installing an oil pan heater on an oil pan while the oil pan is mounted on an engine block. Oil is drained from the engine oil pan. Then the engine oil pan is pierced to provide a pilot hole having pierced ends extending into the engine oil pan. A circular chamfered groove is formed surrounding the pilot hole so as to provide an oil pan thickness at a base of the chamfered groove. A pull is inserted into the oil pan through the pilot hole to engage an internal portion of the oil pan surrounding the pilot hole. The pull extracts a circular slug from the oil pan and a substantially circular hole is formed in the oil pan. An expandable heater bushing is inserted in the substantially circular hole. The heater bushing has an expandable tubular section extending from an enlarged head. The tubular section is crimped and the enlarged head is sealed to the oil pan. Then the heater is attached to the enlarged head.

10 Claims, 11 Drawing Sheets

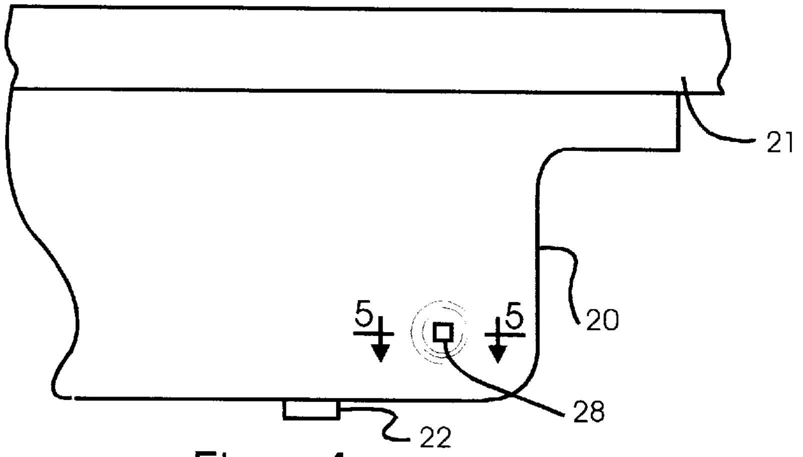
Fig. 4
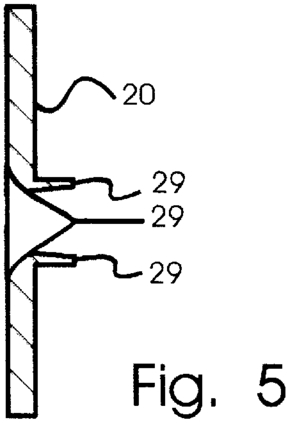
Fig. 5
Fig. 10
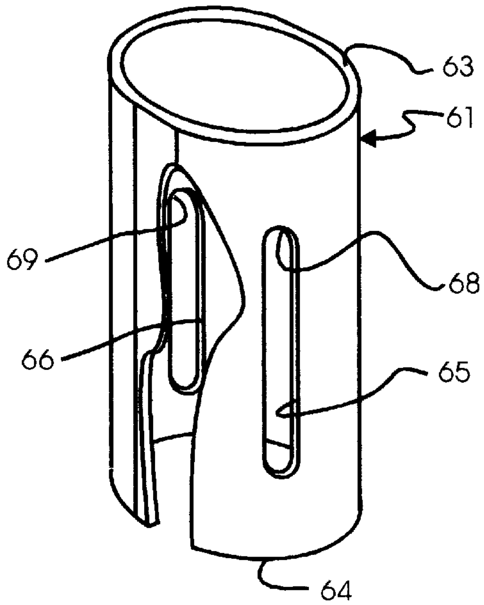

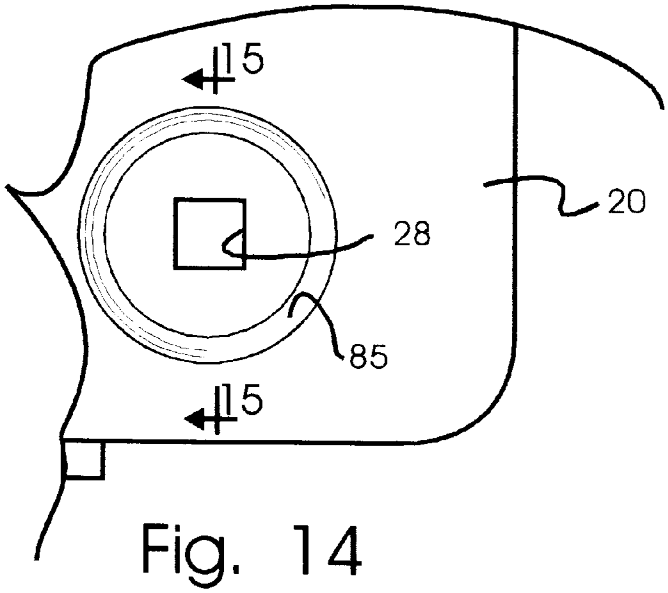
Fig. 14
Fig. 15
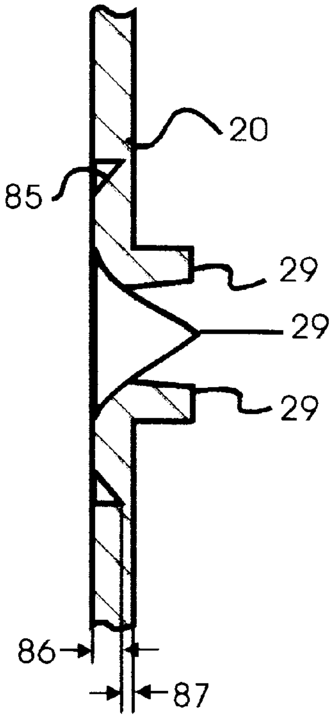
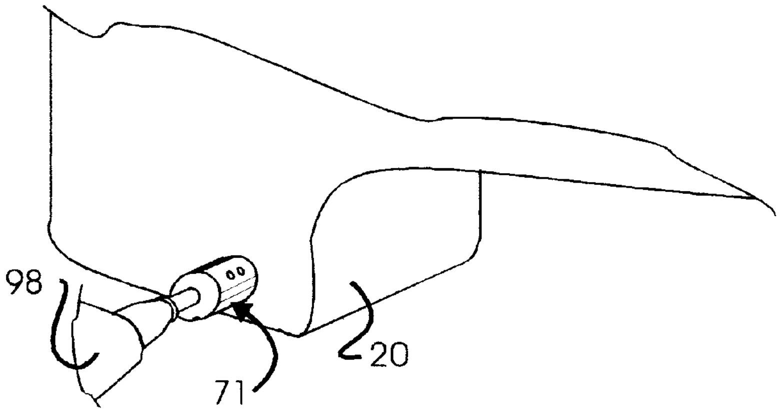
Fig. 17

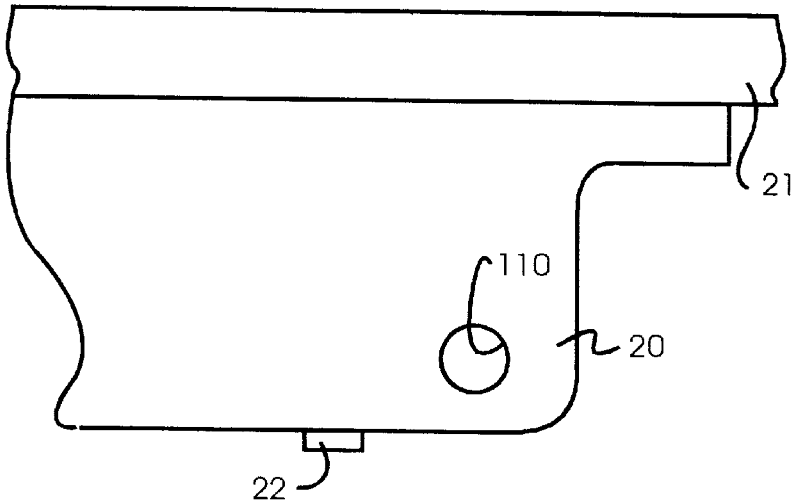
Fig. 22
Fig. 23
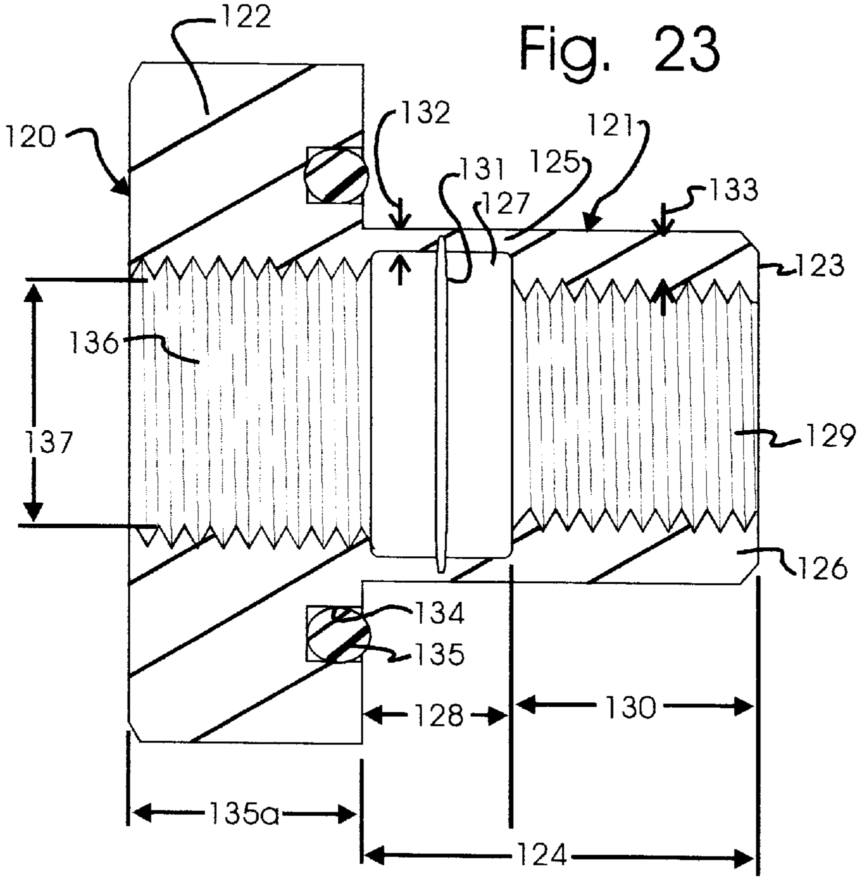

Fig. 24
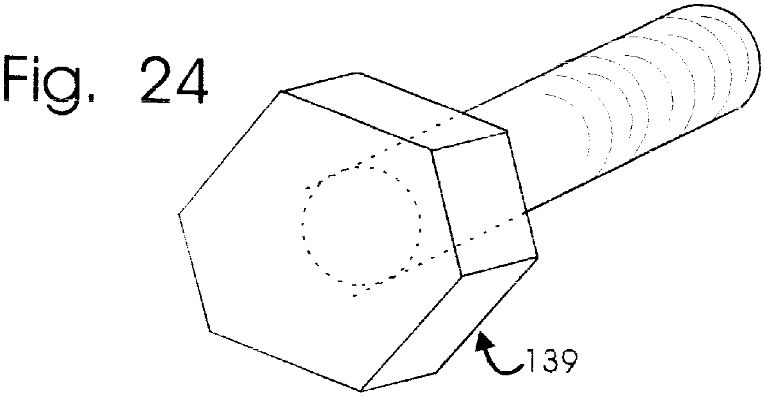
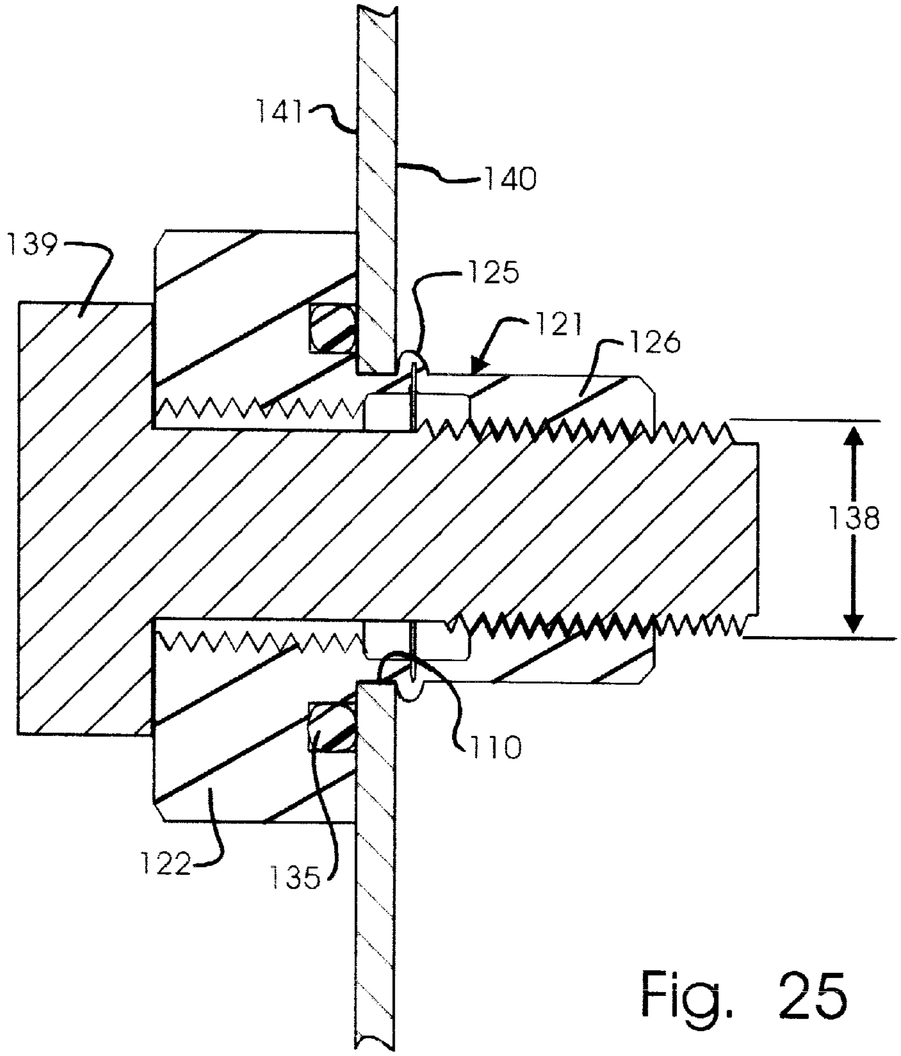
Fig. 25

METHOD OF INSTALLING AN OIL PAN HEATER ON AN OIL PAN MOUNTED ON AN ENGINE BLOCK

FIELD OF THE INVENTION

The present invention relates to a method of installing an oil pan heater on an oil pan, a heater installation kit, and an oil pan heater insert. More particularly the present invention relates to a method of installing an oil pan heater on an oil pan while the oil pan is mounted on the engine block, a kit for installing an oil pan heater while the oil pan is mounted on the engine block, and an oil heater insert for installing an oil pan heater on an oil pan while the oil pan is mounted on the engine block, and an oil heater insert for installing an oil pan heater on an oil pan while the oil pan is mounted on the engine block.

BACKGROUND OF THE INVENTION

The installation of an oil pan heater on an oil pan is known. However the general practice is to drain the oil from the oil pan, remove the oil pan from the engine block, and then drill a hole in the engine oil pan, thread the hole or weld a threaded insert to the hole with the threaded hole or threaded insert being sized to receive a oil pan heater. Then the interior of the oil pan had to be thoroughly cleaned so that there would be no debris that would contaminate the oil that would be in the oil pan when it was mounted on the engine block. This procedure took several hours and generally required the vehicle to be tied up for an entire day. The removal of the oil pan was necessary to prevent metal particles from the drilling to remain in the oil pan. Such particles would contaminate the oil and cause extensive damage to the engine. Therefor there is a need for the present invention which allows an oil heater to be mounted on an oil pan while the oil pan is pan is mounted on the engine block and which procedure will not contaminate the oil which collects and is maintained in the oil pan.

SUMMARY OF THE INVENTION

This invention is directed towards the method of installing an oil pan heater on an oil pan while the oil pan is mounted on the engine block, a kit for installing an oil pan heater while the oil pan is mounted on the engine block, and an oil heater bushing for installing an oil pan heater on an oil pan while the oil pan is mounted on the engine block.

It is therefore one object of the present invention to provide a method of installing a heater on a vehicle engine oil pan that is mounted on a vehicle engine by draining oil from the engine oil pan, piercing the engine oil pan to provide a pilot hole having pierced ends extending into the engine oil pan, scoring a circular chamfered groove surrounding the pilot hole so as to provide an oil pan thickness at a base of the chamfered groove of less than about 10 mils, inserting a puller into the oil pan through the pilot hole to engage an internal portion of the oil pan surrounding the pilot hole, pulling to extract a circular slug from the oil pan and forming a substantially circular hole in the oil pan, inserting an expandable heater bushing in the substantially circular hole, the heater bushing having an expandable tubular section extending from an enlarged head, crimping the tubular section and sealing the enlarged head to the oil pan, and attaching an oil pan heater to the enlarged head.

It is another object of the invention to provide a vehicle engine oil pan heater installation kit for installing an oil pan heater on an engine mounted on an engine block, having an engine oil pan piercing tool having an oil pan punch to punch a pilot hole in a vehicle engine oil pan; means to provide a circular scoring on the engine oil pan surrounding the pilot hole; a slug puller having means to remove a circular slug from a vehicle engine oil pan to provide a heater bushing hole in the vehicle engine oil pan sized to accept an oil pan heater bushing; the oil pan heater bushing having an enlarged head, the enlarged head having a hole therethrough which is threaded and sized to sealingly receive and hold an oil pan heater, an expandable tubular section extending from the enlarged head and adapted to fit through the heater bushing hole, the tubular section having a first end extending from the enlarged head and a distal second end, a passageway concentric with the heater bushing hole, an internal smooth wall extending from the enlarged head a predetermined distance, annular internal threads extending from the internal smooth wall to the distal second end, the tubular section having a crimper to crimp at the smooth wall section when a crimp bolt is threaded into the tubular annular threaded section, and the crimp bolt sized to pass through the enlarged head and be threaded into the tubular section cause the tubular section to crimp and the oil pan heater bushing to sealing engage the interior and exterior of the vehicle engine oil pan.

It is still another object of the present invention to provide an engine oil pan piercing tool having an air chisel shank, a first shoulder at one end of the chisel shank, a second shank extending from the first shoulder to a second shoulder, a punch retainer extending from the second shoulder to a punch retaining end, a compression spring surrounding a portion of the cylindrical retainer the one end contacting the second shoulder and the other end of the spring contacting a scatter shield, the scatter shield being mounted on the piercing tool retainer to move axially relative to the piercing tool retainer wherein the compression spring in the normal position positions the scatter shield to surround a pointed end of a punch mounted in the punch retainer and when in the piercing position to be compressed and exposed the punch pointed end and piecing sections.

It is still a further object of the present invention to provide a vehicle engine oil pan heater bushing having an enlarged head, the head having a hole therethrough which is threaded and sized to sealingly receive and hold an oil pan heater, an expandable tubular section extending from the enlarged head and adapted to fit through an engine oil pan heater bushing hole, a non-expandable tubular section extending from the expandable tubular section to a distal end, an expandable tubular section having an internal smooth wall section extending from the enlarged head a predetermined distance, annular internal thread section extending inward from a distal end for a predetermined distance, crimp means permit the expandable tubular section to crimp at the smooth wall section when a draw bolt is threaded into the tubular section, an annular o-ring groove formed in the underside of the enlarged head, the annular groove being sized to hold an o-ring, the enlarged head and annular groove o-ring being sized to surround the heater bushing hole and contact an external surface of the oil pan when the tubular section is placed into the oil pan through the heater bushing hole.

The present invention can be further understood with reference to the following description in conjunction with the appended drawings wherein like elements are provided with the same reference numerals.

BRIEF DESCRIPTION OF THE DRAWINGS

FIG. 4 is a partial side view of the vehicle engine oil pan after the step of FIG. 2.

FIG. 5 is a partial enclosed cross-sectional view taken along lines 5—5 of FIG. 4.

FIG. 10 is a front perspective view with cut away portions of the piercing tool shield of the present invention.

FIG. 14 is a partial side view of the vehicle engine oil pan after being grooved by the fly cutter of FIG. 11.

FIG. 15 is an enlarged cross-section view taken along lines 15—15 of FIG. 14.

FIG. 17 is a partial perspective view of another step of the method of the present invention.

FIG. 22 illustrates another step of the present invention.

FIG. 23 is a partial cross-sectional view of the heater bushing insert of the present invention.

FIG. 24 is a perspective view of a crimp bolt used with the heater bushing of FIG. 21.

FIG. 25 is a partial cross-sectional view of the heater bushing of FIG. 21 mounted on a vehicle engine oil pan.

DETAILED DESCRIPTION OF THE INVENTION

Figure 1:
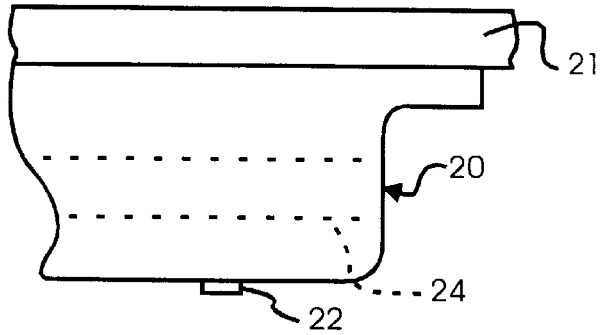
FIG. 1 is a partial side view of a vehicle engine oil pan mounted on a vehicle engine block.
Figure 2:
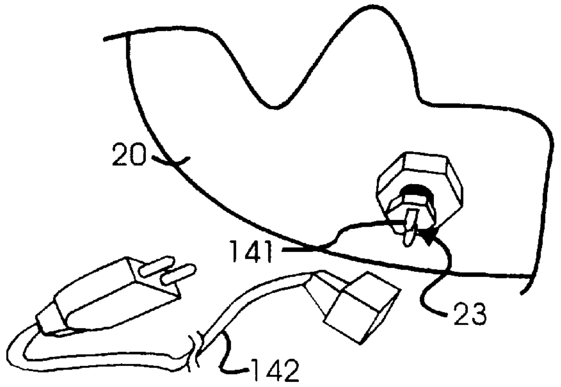
FIG. 2 is a partial perspective illustrating a vehicle engine oil pan of the present invention having an oil pan heater mounted thereon.

When referring to FIGS. 1 and 2, there is shown a vehicle engine oil pan 20 mounted on a vehicle engine block 21. The vehicle engine block 21 is mounted on a vehicle (not shown). The vehicle engine oil pan 20 has an oil drain plug 22 that allows oil 24 to be drained from the vehicle engine oil pan 20. When it is desired to install a vehicle oil pan heater 23 on the vehicle engine oil pan 20, the oil drain plug 22 is opened and the oil 24 is drained from the vehicle engine oil pan 20.

Figure 3:
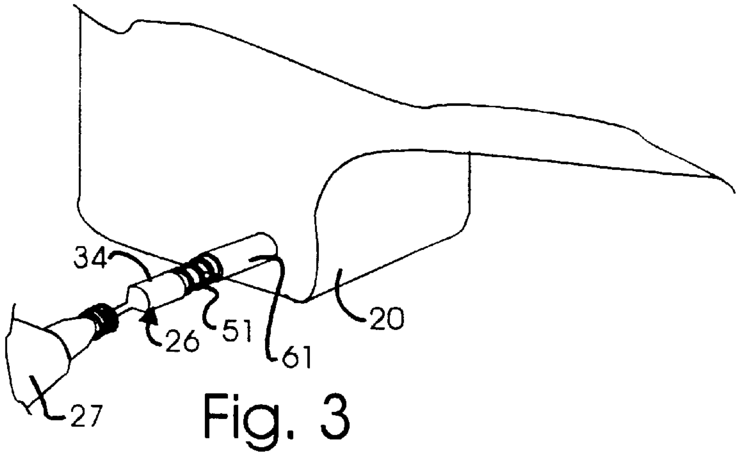
FIG. 3 is a partial perspective view of one step of the method of the present invention.
Figure 6:
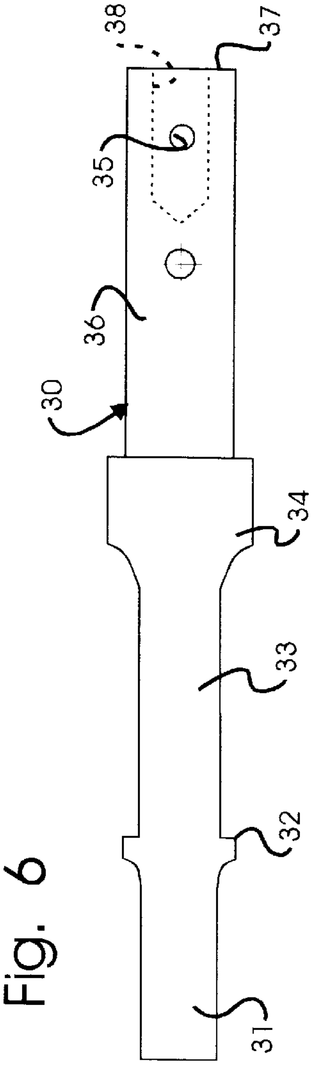
FIG. 6 is a side view of the main section of the piercing tool of the present invention.

Referring to FIGS. 3–5, after the oil is completely drained from the vehicle engine oil pan, a piercing tool 26 is attached to an air chisel 27 and used to punch vehicle engine oil pan 20 to provide an oil pan pilot hole 28. As shown in FIG. 4, the preferred shape of the oil pan pilot hole 28 is rectangular shaped with four (4) pierced ends 29 (only three being shown in FIG. 5) extending into the vehicle engine oil pan 20.

Referring to 3, 6 and 9, the piercing tool 26 has a main section 30. The piercing tool main section 30 has a actuator shank 31 preferably sized to fit the air chisel 27. If desired, this actuator shank can be sized and shaped to be used to manually actuate the piercing tool 26, i.e., by a hammer. Below the piercing tool actuator shank, is a shoulder 32 which in this case, along with the piercing tool actuator shank 31, is used by the air chisel to actuate the piercing tool 26. Below the shoulder is a shaft 33 extending to a second enlarged shoulder 34. The piercing tool actuator shank 31 is preferably shaped and sized to fit the chuck of a readily available air chisel i.e. about ⅜ inch diameter or sized to alternatively be used manually and thus strong enough to accept the blow of an appropriate hammer. The piercing tool actuator shank 31 is sized and the entire piercing tool main section 30 is sized and preferably made of steel or a material so that it is strong enough for repeated use on vehicle engine oil pans having a thickness of at least 0.035 inches. The shaft 33 preferably has a circumference that is larger and a length that is longer than the circumference and length of the piercing tool actuator shank 31.

The means section 30 has a punch retainer 36 extending from the second shoulder 34. The punch retainer 36 has a circumference greater than the circumference of the shaft 33 and a length longer than the length of the shaft 33. The punch retainer 36 extends from the under side of the enlarged shoulder 34 to a punch retainer end 37. The punch retainer end 37 has a punch retainer bore 38 drilled therein. The punch retainer bore 38 is sized to hold a piercing punch 40 (FIGS. 7 and 8) and preferably sized to hold the piercing punch 40 with a sliding fit.

The various sections of the piercing tool main section 30 are shown as being substantially cylindrical. However the shape of these sections can be any desired shape as long as they can perform the functions set forth.

Figure 8:
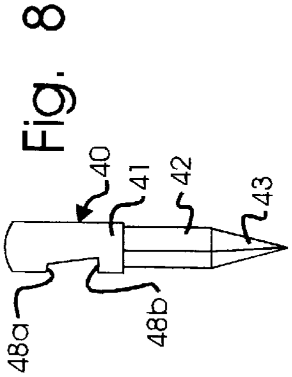
FIG. 8 is a side view of the piercing tool punch of FIG. 7.
Figure 7:
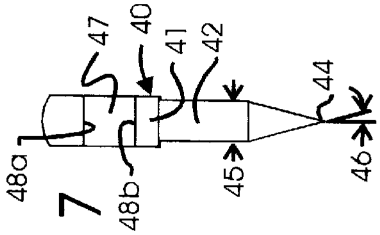
FIG. 7 is a front view of the piercing tool punch of the present invention.
Figure 18:
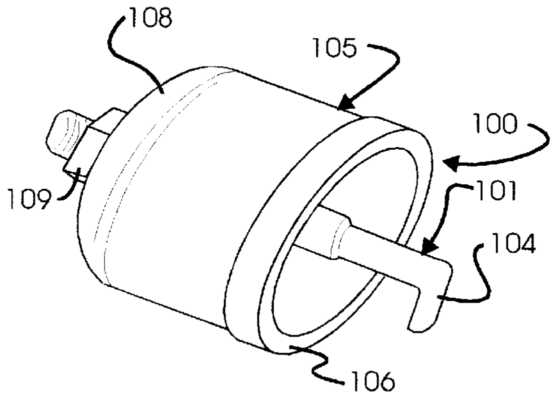
FIG. 18 is a bottom perspective view of a slug puller of the present invention.
Figure 19:
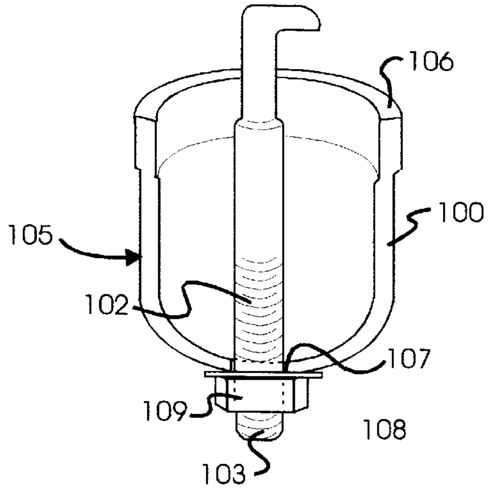
FIG. 19 is a partial cross-sectional view of the slug puller of FIG. 18.
Figure 20:
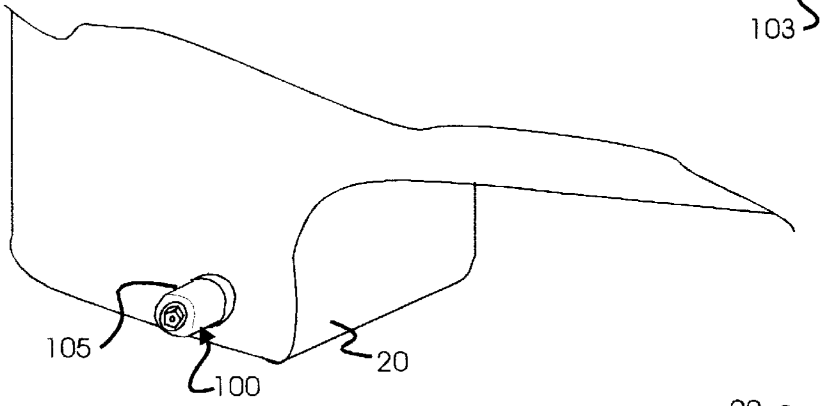
FIG. 20 is a partial perspective view of still another step of the method of the present invention.

Referring to FIGS. 7 and 8, the punch 40 has a punch shank 41 and an elongated rectangular piercing section 42 extending from the punch shank 41. The piercing section 42 preferably has a square cross-section. Extending from the rectangular piercing section is an elongated pyramid shaped piercing section 43 ending in a sharp piercing tip 44. As seen the piercing tip 44 is the apex of the pyramid shaped piercing section 43. The base of the pyramid piercing section 43 or cross-section of the rectangular section has a width 45 of at least 0.25 inches to punch a hole sufficiently large to permit insertion of a slug puller tool 100 (FIGS. 18 and 19).

The pyramid piercing section we now use has a side angle 46 of 30° or less and preferably 20° or less. This enables the piercing punch 40 to easily penetrate the vehicle engine oil pan without distorting the oil pan.

The punch shank 41 has a set screw angled holding flat surface 47 with an upper set screw shoulder **48*a* and a lower set screw shoulder 48***b*. A typical punch shank 41 has a ⅜ inch diameter and is 1 to 1¼ inches long. The punch shank is slid into the punch retainer port 38 with the flat surface facing the punch retainer set screw threaded hole 35 such that the rectangular and pyramid piercing sections 42 &43 of the punch sufficiently extend from the end 37 of the punch retainer 36. The punch shank is held in the retainer bore 38 by a set screw 49 threaded into the threaded set screw hole 35. The punch set screw 49 will engage the holding flat surface 47.

The shape of the various sections of the piercing tool main section 30 is optional. The cylindrical shapes shown are the preferred shapes.

Figure 9:
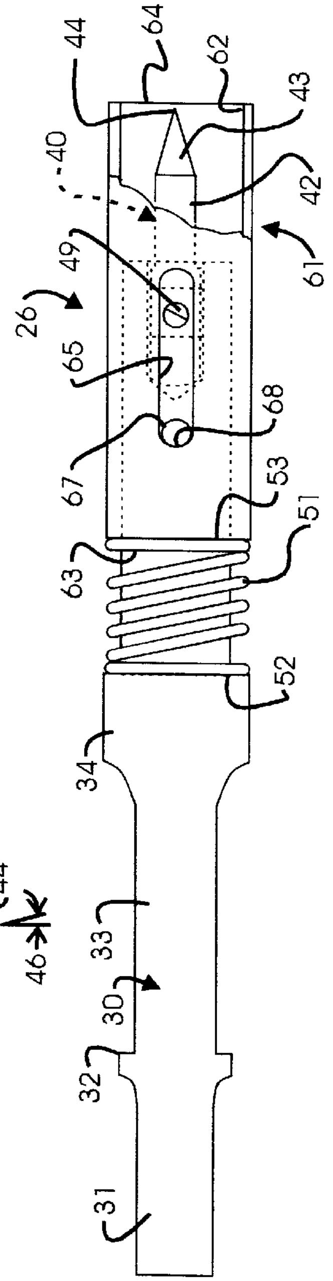
FIG. 9 is a side view of the piercing tool of the present invention.

Referring to FIGS. 3 and 9, a compression spring 51 is slid around the punch retainer 36 until one end 52 of the spring 51 abuts the second cylindrical shoulder 34.

The compression spring 51 is preferably made of steel or a material sufficiently strong enough for repeated use of the piercing tool on a 0.060 inch vehicle engine oil pan.

Referring to FIGS. 9 and 10, a shield 61 having an internal passageway 62 is slid around the punch retainer 36 and has one end 63 abutting the other end 53 of the compression spring 51. The other end 64 of the shield extends to or slightly beyond the punch tip 44. The shield 61 preferably has a two diametrically spaced longitudinal slots 65 & 66. The length of the longitudinal slots 65 & 66 are sufficient to allow the shoulder 34 to move towards the shield to compress the spring 51 and expose the rectangular and pyramid punch sections 42 & 43 to permit these punch sections to pierce the oil pan. A guide rod 67 is attached to the punch retainer 36 between the shoulder 34 and the closed end of the retaining bore 38. The guide rod 67 diametrically extends through the punch retainer into both slots 65 & 66 such that guide rod guides the retainer to longitudinally move relative to the punch retainer. The length of the guide rod is preferably equal to the diameter of the shield. As shown in FIG. 9, when the shield 61 is mounted on the punch retainer 36, the spring 51 is slightly compressed so that the spring urges the guide towards the punch and the shield surrounds the punch tip 44, and the guide rod 67 abuts the upper ends 68 & 69 of the slots 65 & 66.

In the preferred structure, the punch set screw 49 can be accessed through one of the slots 65 & 66. In this way, the punch 40 can be removed from and reinserted into the punch retainer bore 38 when it is desired to replace and/or sharpen the punch section 43 and/or 42.

As shown in FIG. 3, the assembled piercing tool 26 is mounted onto the air chisel 27. The guide end 64 is placed against the emptied oil pan 20 while the oil pan is still mounted on the engine block. The punch 40 is manually pushed towards the oil pan to set the position of the piercing punch 40, the air chisel is activated to move the piercing tool main section 30 towards the oil pan and cause the second shoulder 34 to compress the spring 51 and move the second shoulder towards the shield, and the punch 40 to pierce the oil pan. The compressed spring 51 then exerts sufficient force against the shield so that the shield will surround the punch sections 42 & 43 as they are retracted from the oil pan. The shape of punch sections 42 and 43 form the rectangular hole 28 having the flared ends 29 extending into the oil pan 20 (FIGS. 4 & 5). The scatter shield 61 acts as a safety device to prevent the expulsion of pieces of a broken punch should the punch 40 break during the piercing process.

Figure 11:
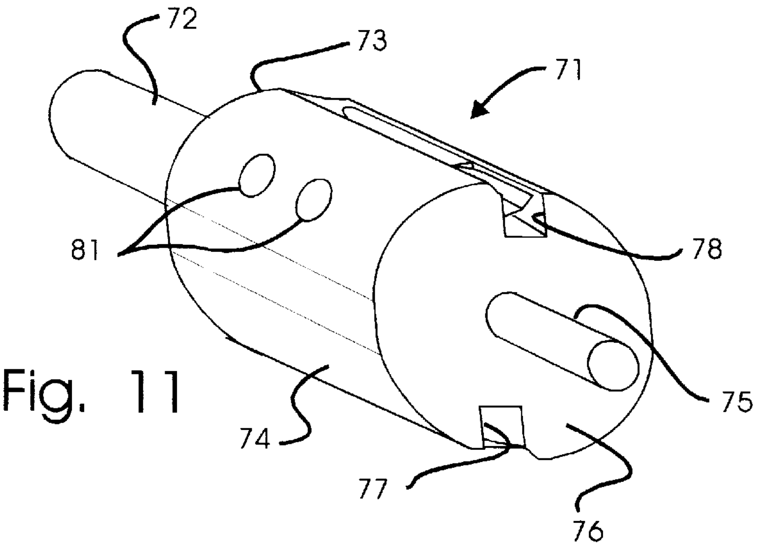
FIG. 11 is a front perspective view of a flycutter of the present invention.
Figure 12:
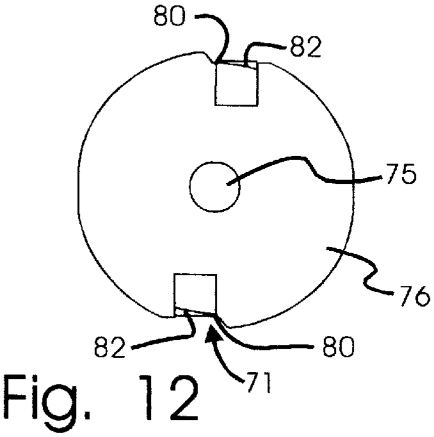
FIG. 12 is a plane right end view of the fly cutter of FIG. 11.
Figure 13:
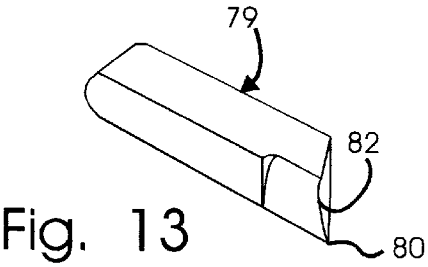
FIG. 13 is a side perspective view of one of the tool bits used in the fly cutter of FIG. 11.

Referring to FIGS. 11–13, there is shown a fly cutter 71 that is used in the present invention. The fly cutter 71 as shown, has a drill shank 72 axially extending from one end 73 of a tool bit retainer 74, and a pilot shank 75 axially extending from the other end 76 of the tool bit retainer 74. The tool bit retainer 74 has a pair of spaced cutter retainer slots 77 & 78 formed therein and sized to hold two metal tool bits 79. Each of the tool bits 79 & 80 are held in their respective retainer slots 77 & 78 by a pair of set screws 81 for each retainer slot such that their leading cutting tip 80 is dramatically spaced.

Figure 21:
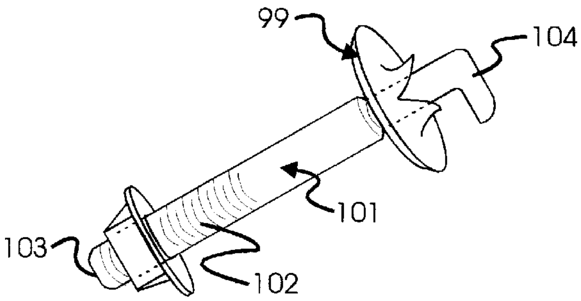
FIG. 21 illustrates another step of the present invention.

As shown in FIGS. 14 and 15, the ends 82 of the tool bits are shaped to cause a chamfered cylindrical groove 85 in the oil pan 20. The depth 86 of the chamfered groove is adjusted to leave after grooving an oil pan thickness 87, of 7.5 mils or less and preferably 5 mils or less. The depth of the groove is sufficient to extract a circular slug 99 (FIG. 21) from the oil pan without damaging the oil pan. Also, it is important that the tool bits do not cut through the oil pan 20. Cutting through the oil pan would increase the risk that debris would enter the oil pan.

Figure 16:
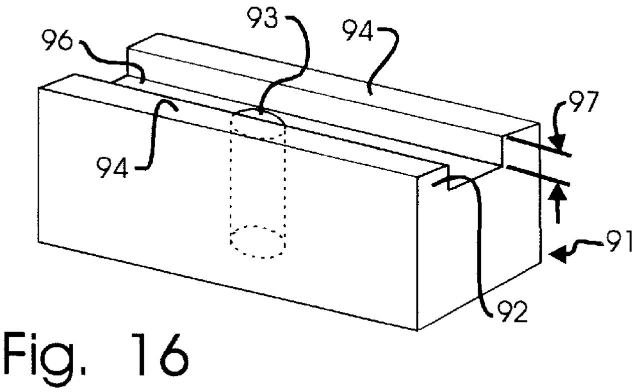
FIG. 16 is a top perspective view of a fly cutter tool bit adjusting tool of the present invention.

The tool bits 79 are accurately adjusted on the fly cutter 71 by using the tool bit adjusting tool 91 shown in FIG. 16. The tool bit adjusting tool 91 is preferably a steel block 92 having a central guide hole 93 drilled through the center thereof. The guide hole 93 is sized to receive the fly cutter pilot 75. When the fly cutter pilot 75 is inserted into the guide hole 93, the flat face 76 of the fly cutter retainer will abut the top flat face 94 of the tool bit adjusting tool 91. A longitudinally extending cutter tool bit receiving groove 96 having a width equal to or greater than the diameter of the guide hole 93 extends the length of the adjusting tool such that the axis of the groove passes through the diameter of the guide hole. The width of the groove is also sufficient to accommodate the width of the tool bits 79. The depth 97 of the slot is set for the normal thickness of an engine oil pan 20 minus the desired chamfered groove depth 86. For instance, the thickness of a truck oil pan mounted on a typical diesel engine block is generally 0.060 inches. To leave a thickness of 5 mils, the depth 86 of the oil pan chamfered groove 85 and the depth 97 of the tool bit adjusting tool groove 96 should be 0.055 inches.

To adjust the tool bits 79, the fly cutter pilot shank 75 is placed in the guide hole 93 to allow the flat face 76 of the retainer 74 to contact the flat face 94 of the adjusting tool and the tool bits 79 of the fly cutter are positioned over or in the groove 96. The tool bits 79 are lowered into the groove 96 until the tip 80 of each of the tool bits contact the base of the grove 96. When this occurs, the tool bits 79 are locked in place by tightening each of the set screws 81.

As shown in FIGS. 4, 11, 14, 15 and 17, the fly cutter 71 is connected to a drill motor 98. The cutter pilot shank 75, is inserted the oil pan pilot hole 28. The motor and fly cutter are activated and the chamfered groove is 85 is formed on the surface of the oil pan.

After the groove 85 is formed, a slug puller 100 as shown in FIGS. 18–21 is used to extract a circular slug 99 from the oil pan. The slug puller 100 has a pull bolt 101 with threads 102 at one end 103 and an angular projection 104 at the other end. The pull bolt 101 fits through a cap 105 having an open cylindrical end 106. The open end has an inner diameter of preferably greater than 1.25 inches. A cap hole 107 extends through the cap top surface 108 to permit the pull bolt threaded end 103 to extend therethrough. A nut 109 is provided to tighten the bolt 101. The cap must be strong enough to permit a 1 inch slug 99 to be removed from the scored oil pan. In operation, the angled end 104 of the pull bolt 101 is inserted into the oil pan pilot hole 28 so that the angled section 104 rests on flared ends of the oil pan pilot hole 28 inside the oil pan. The threaded end 103 of the bolt is passed through the cover hole and the nut 109 is placed on the pull bolt threads 102 and the nut is tightened to position the cap so that the cap open end 106 contacts the oil pan and surrounds the cylindrical chamfered groove 85. The nut is then continuously tightened until the circular slug 99 is removed from the oil pan to leave about a 1 inch oil pan heater is bushing hole 110 (FIG. 22) in the vehicle engine oil pan 20.

Referring to FIG. 23, there is illustrated the oil pan expandable heater bushing 120 which is preferably made of steel. However, any material can be used that can withstand the types of temperature extremes in which a vehicle engine oil pan may encounter. The vehicle engine oil pan heater bushing 120 is preferably one piece having a 1 inch tubular section 121 adapted to fit through the oil pan heater hole 110. The tubular section 121 extends from an enlarged head 122 to a distal end 123 a predetermined distance 124 i.e., about ⅞ inches. The tubular section has an expandable tubular section 125 and a non-expandable tubular section 126. The non-expandable section 126 extends from the expandable section 125 to the distal end 123. The tubular expandable section 125 has an internal smooth wall section 127 extending from the enlarged head 122 a predetermined distance 128, i.e., about 7/16 inches. Annular internal threads 129 are provided in the non-expandable tubular section 126 that extend inwardly from the distal end 123 towards the enlarged head 122 a predetermined distance 130 i.e., about 7/16 inches. An annular crimp groove 131 is formed approximately mid-way of the smooth wall section. The annular crimp groove 131 has sufficient depth to permit the tubular section to crimp or expand at the smooth wall section. The annular smooth wall section has a wall thickness 132 of about 0.040 inches. This thickness 132 is less than the thickness 133 of the annular threaded section.

An annular o-ring groove 134 is formed in the underside of the head 122. This o-ring annular groove 134 is sized to hold an o-ring 135. The head and o-ring annular groove are sized to surround the oil pan hole 110, FIGS. 22 and 25, and contact an external surface of the oil pan when the tubular section is inserted into the oil pan through the oil pan heater bushing hole 110. The enlarged head shown in FIGS. 23 and 25 is the shape of a hexagonal nut having a thickness **135*a* of about ⅝ inches. The annular thread section 129 has a threaded hole sized to receive a crimping bolt 139 (FIGS. 24 and 25). The enlarged head has internal annular threads 136 that are sized to sealingly receive an oil pan heater 23 and are concentric with the tubular section and have an inner diameter 137 slightly larger than the outer diameter 138** of the crimping bolt to allow the crimping bolt to freely pass therethrough.

As shown in FIGS. 22 and 25, the crimp bolt 139 is threaded into the oil pan heater bushing non-expandable tubular section 126. The oil pan heater bushing tubular section 121 is inserted into the bushing hole 110. The bushing hexagonal head 122 is now held by an appropriate wrench and the crimp bolt 139 is turned to cause the expandable tubular section 125 to crimp and abut the internal surface 140 of the oil pan while the o-ring 135 sealingly engages the outer surface 141 of the oil pan 20 and the enlarged head 122 engages the outer walls of the oil pan. Once the oil pan heater bushing is sealingly attached to the oil pan, the crimping bolt 139 is removed and the oil heater (FIG. 2) is inserted through the oil pan heater bushing 120 and threaded into oil pan heater bushing head 122. The oil pan heater has appropriate electrical connections 142 (FIG. 2) for connecting the heater to an appropriate electrical outlet by way of an appropriate electrical cord 143.

Figure 26:
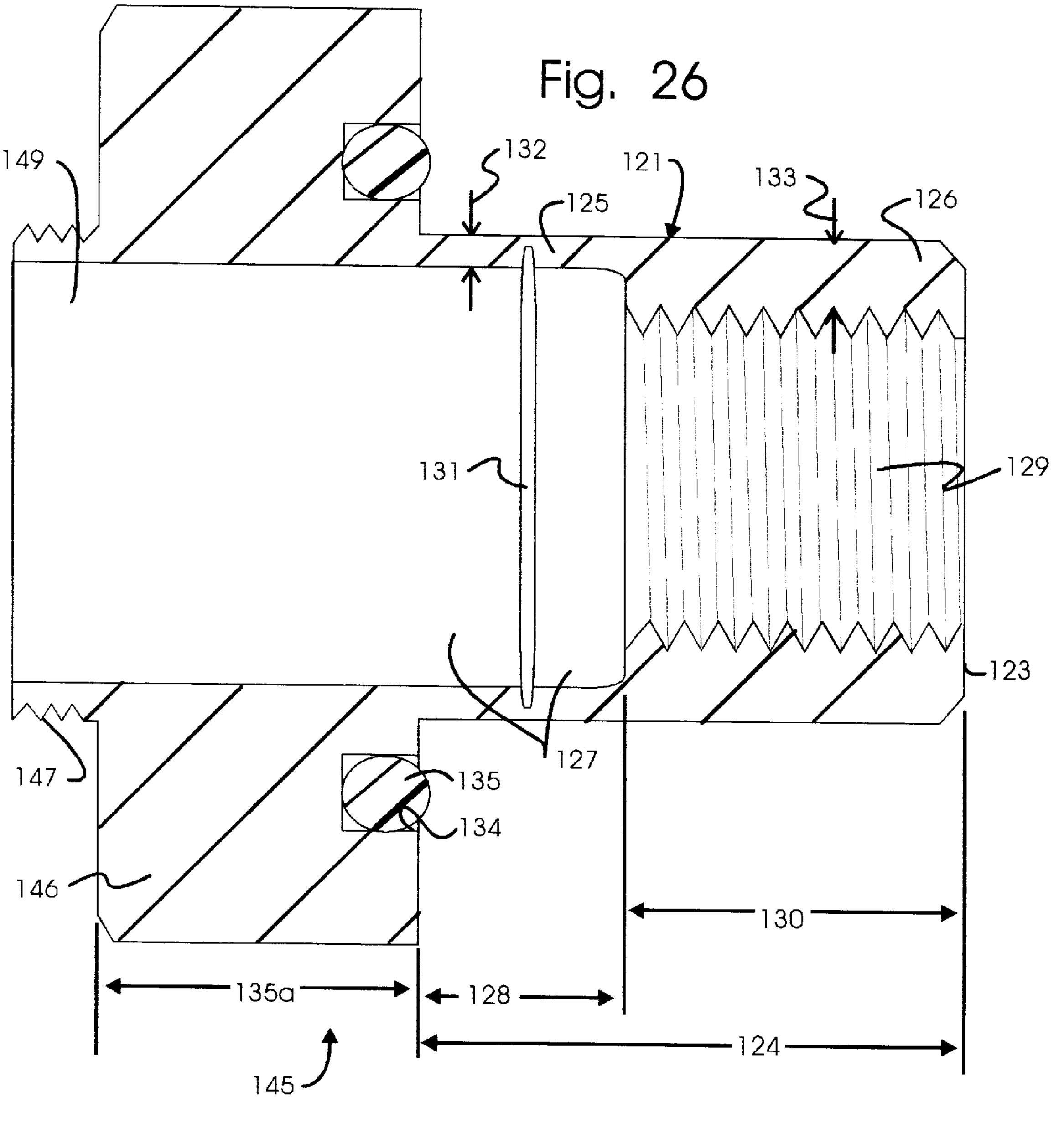
FIG. 26 is a cross-sectional view of another heater bushing according to the present invention.

Referring to FIG. 26, there is illustrated the oil pan expandable heater bushing 145 which is similar to expandable heater bushing 120 (FIG. 23). Therefore, the same reference numbers are used to identify substantially identical parts. The vehicle engine oil pan heater bushing 145 has tubular section 121 adapted to fit through the oil pan heater hole 110. The tubular section 121 extends from an enlarged head 146 to a distal end 123 a predetermined distance 124. The tubular section has an expandable tubular section 125 and a non-expandable tubular section 125. The non-expandable section 126 extends from the expandable section 125 to the distal end 123. The tubular expandable section 125 has an internal smooth wall section 127 extending from the enlarged head 146 a predetermined distance 128. Annular internal threads 129 are provided in the non-expandable tubular section 126 that extend inwardly from the distal end 123 towards the enlarged head 146 a predetermined distance 130. An annular crimp groove 131 is formed approximately mid-way of the expandable smooth wall section 126. The annular crimp groove 131 has sufficient depth to permit crimping or expanding at the expandable smooth wall section. The annular smooth wall section has a wall thickness 132 which is less than the thickness 133 of the annular threaded section.

Figure 27:
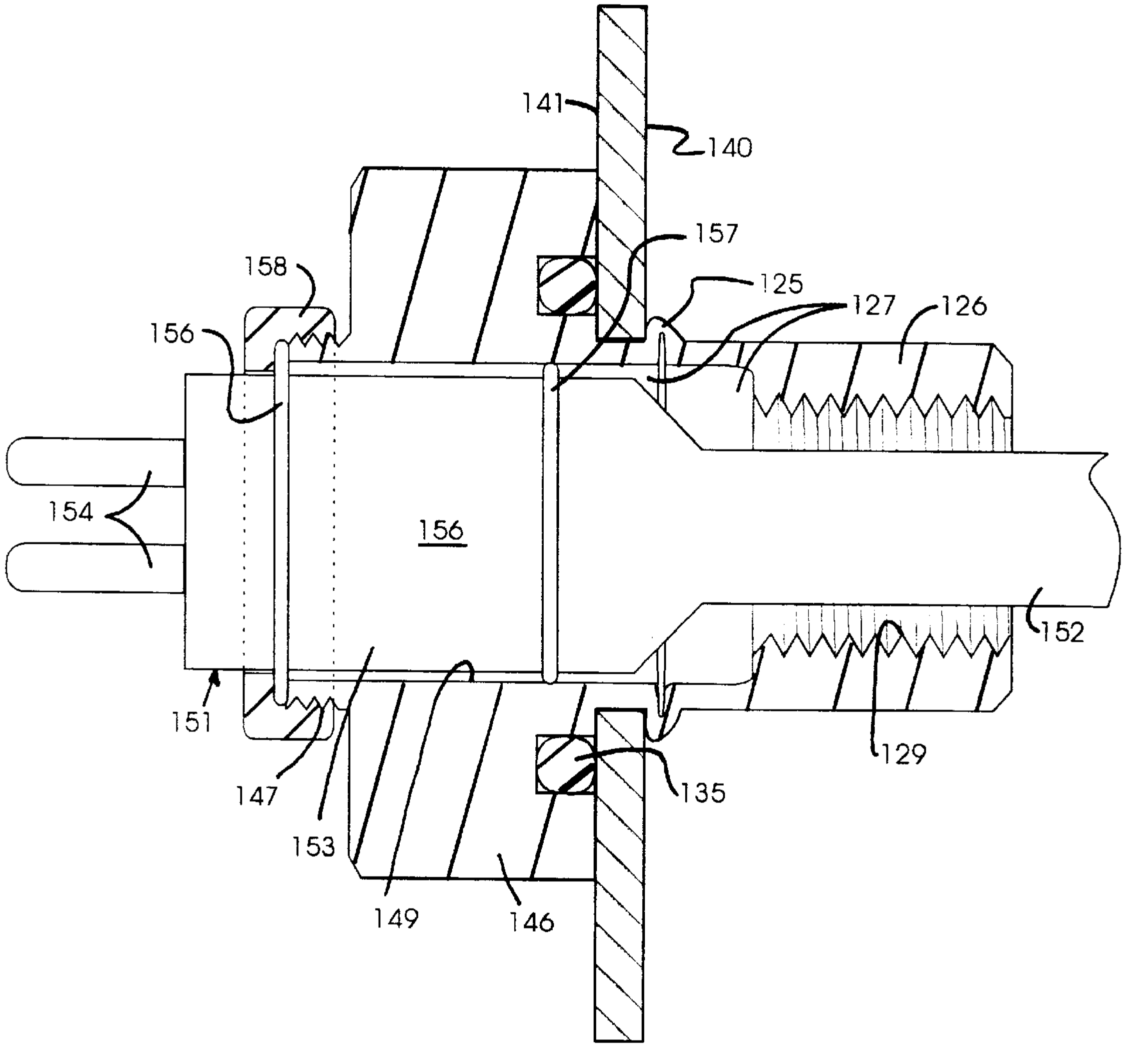
FIG. 27 is a partial cross-sectional view of the heater bushing of FIG. 26 mounted on a vehicle engine oil pan and having a heater attached thereto.

An annular o-ring groove 134 is formed in the underside of the head 146. This o-ring annular groove 134 is sized to hold an o-ring 135. The head and o-ring annular groove are sized to surround the oil pan hole 110, FIGS. 22 and 27, and contact an external surface of the oil pan when the tubular section is inserted into the oil pan through the oil pan heater bushing hole 110. The enlarged head shown in FIGS. 26 and 27 is the shape of a hexagonal nut having a thickness **135*a*. The annular thread section 129 has a threaded hole sized to receive a crimping bolt 139 (FIG. 24). The enlarged head 146 has an annular external threaded section 147 extending a predetermined distance therefrom. The enlarged head 146 has internal smooth wall 149 that extends from the end 148 of the external threaded section 147 to the expandable smooth wall 127 and is coterminus with the wall 127. The wall 149 is concentric with the tubular section 121 and has a diameter larger than the outer diameter 138** of the crimping bolt to allow the crimping bolt to freely pass therethrough.

As noted above, the crimp bolt is threaded into the oil pan heater bushing nonexpandable tubular section 126. The oil pan heater bushing tubular section 121 is inserted into the bushing hole 110. The bushing hexagonal enlarged head 146 is now held by an appropriate wrench and the crimp bolt is turned to cause the expandable tubular section 125 to crimp and abut the internal surface 140 of the oil pan 20 while the o-ring 135 sealingly engages the outer surface 141 of the oil pan 20. Once the oil pan heater bushing is sealingly attached to the oil pan, the crimping bolt is removed and an oil heater 151 is attached to the enlarged head 146. The heater 151 has an elongated tubular heating element 152 extending from one end of a heater head 153. Extending from the other end of the heater head 153 are a pair of electrical connections 154. The electrical connections 154 are sized to connect the heater to an appropriate electrical cord. Also, the electrical connections are electrically connected to the heating element 152. The heater head has a tubular section 156 with an o-ring 157. The tubular section and o-ring are sized to fit in the smooth wall 149 so that the o-ring 157 sealingly engages the smooth wall 149. An annular nut 158 and seal 159 attaches the heater 151 to the head threaded section 147.

Figure 28:
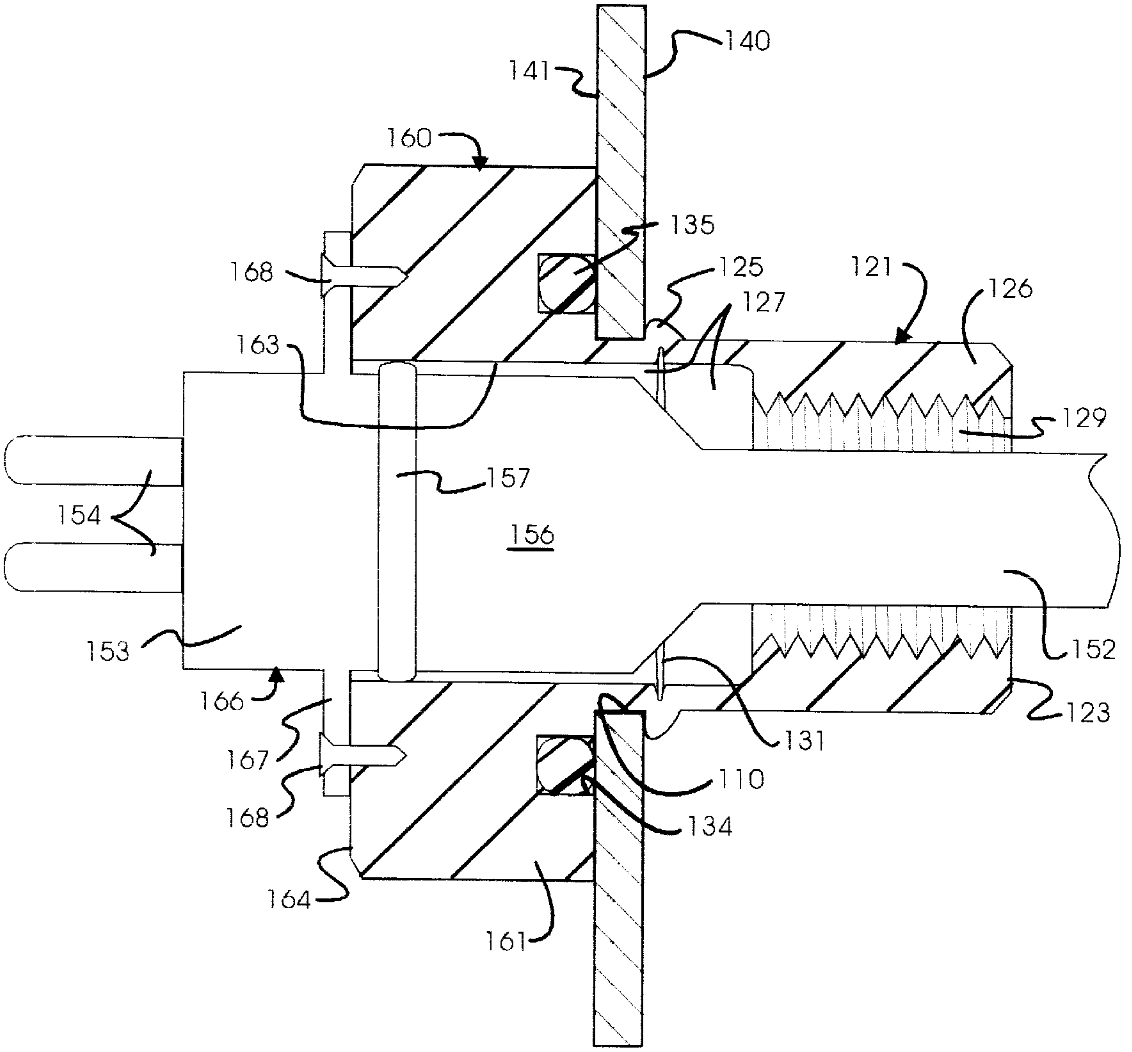
FIG. 28 is a partial cross-sectional view of still another heater bushing according to the present invention mounted on a vehicle engine oil pan and having a heater attached thereto.

Referring to FIG. 28, there is illustrated the oil pan expandable heater bushing 160 which is similar to expandable heater bushing 120 (FIG. 23). Therefore, the same reference numbers are used to identify substantially identical parts. The vehicle engine oil pan heater bushing 160 has tubular section 121 adapted to fit through the oil pan heater hole 110. The tubular section 121 extends from an enlarged head 161 to a distal end 123 a predetermined distance 124. The tubular section has an expandable tubular section 125 and a non-expandable tubular section 126. The non-expandable section 126 extends from the expandable section 125 to the distal end 123. The tubular expandable section 125 has an internal smooth wall section 127 extending from the enlarged head 161 a predetermined distance. Annular internal threads 129 are provided in the non-expandable tubular section 126 that extend inwardly from the distal end 123 towards the enlarged head 161 a predetermined distance. An annular crimp groove 131 is formed approximately mid-way of the expandable smooth wall section 127. The annular crimp groove 131 has sufficient depth to permit crimping or expanding at the expandable smooth wall section. The annular smooth wall section has a wall thickness which is less than the thickness of the annular threaded section.

An annular o-ring groove 134 is formed in the underside of the head 146. This o-ring annular groove 134 is sized to hold an o-ring 135. The head and o-ring annular groove are sized to surround the oil pan hole 110, FIGS. 22 and 28, and contact an external surface of the oil pan when the tubular section is inserted into the oil pan through the oil pan heater bushing hole 110. The enlarged head shown in FIG. 28 is the shape of a hexagonal nut. The annular thread section 129 has a threaded hole sized to receive a crimping bolt 139 (FIG. 24). The enlarged head 161 has an annular smooth wall section 163 extending from the enlarged head end 164 to the wall 127 and is coterminus with the wall 127. The smooth wall section 163 is concentric with the tubular section 121 and has a diameter slightly larger than the outer diameter 138 of the crimping bolt to allow the crimping bolt to freely pass therethrough.

As noted above, the crimp bolt is threaded into the oil pan heater bushing non-expandable tubular section 126. The oil pan heater bushing tubular section 121 is inserted into the bushing hole 110. The bushing hexagonal enlarged head 161 is now held by an appropriate wrench and the crimp bolt is turned to cause the expandable tubular section 125 to crimp and abut the internal surface 140 of the oil pan 20 while the o-ring 135 sealingly engages the outer surface 141 of the oil pan 20. Once the oil pan heater bushing is sealingly attached to the oil pan, the crimping bolt is removed and an oil heater 166 is attached to the heater bushing head 161. The heater 166 is almost identical to the heater 151 and therefore the same part numbers are used. The heater 166, however, has a flange 167 extending from the heater head 153. The flange, with a pair of bolts or screws 168, are used to attach the heater to the enlarged head 161.

The heater 166 has an elongated tubular heating element 152 extending from one end of a heater head 153. Extending from the other end of the heater head 153 are a pair of electrical connections 154. The electrical connections 154 are sized to connect the heater to an appropriate electrical cord. Also, the electrical connections are electrically connected to the heating element 152. The heater head has a tubular section 156 with an o-ring 157. The tubular section and o-ring are sized to fit in the smooth wall 149 so that the o-ring 157 sealingly engages the smooth wall 149.

Although I have described my invention as a method of installing an oil pan heater in an engine oil pan mounted on an engine block, the method is applicable for mounting other devices in an engine oil pan such as sensors, fill tubes, fluid level indicators, etc. by using the bushings 120, 145 and/or 166 to mount these devices.

The foregoing description is for purposes of illustration only and is not intended to limit the scope of protection accorded to the invention. The scope of protection is to be measured by the following claims, which should be interpreted to give me the broadest protection possible due to my inventive contribution.

What is claimed is:

1. A method of installing a heater on a vehicle engine oil pan that is mounted on a vehicle engine and said engine oil pan having an oil drain plug comprising draining oil from the engine oil pan, piercing the engine oil pan to provide a pilot hole having pierced ends extending into said engine oil pan, scoring a circular chamfered groove surrounding the pilot hole so as to provide an oil pan thickness at a base of the chamfered groove of less than about 10 mils, inserting a pull means into said oil pan through said pilot hole to engage an internal portion of the oil pan surrounding said pilot hole, pulling said pull means to extract a circular slug from said oil pan and forming a substantially circular hole in said oil pan, inserting an expandable heater bushing in said substantially circular hole, said heater bushing having an expandable tubular section extending from an enlarged head, crimping said tubular section and sealing the enlarged head to the oil pan, and attaching the heater to the enlarged head.

2. The method of claim 1 comprising:

piercing the engine oil pan by a piercing tool having a first end sized to act with means to actuate the piercing tool, a second end adapted to have a metal punch extending therefrom providing a non-expandable tubular section extending from said expandable tubular section and having internal threads adjacent a distal end, providing said expandable tubular section with an expandable section that has walls thinner than said non-expandable section, providing said enlarged head with attaching means to accept an oil pan heater and said attaching means of said enlarged head having an opening with a diameter larger than the diameter of said non-expandable tubular section, said enlarged head having a shoulder adapted to contact an external wall of said engine oil pan surrounding said substantially circular hole, providing seal means to seal said enlarged head to said external wall, inserting a draw bolt through said enlarged head and threading it into the non-expandable tubular section, continuing the threading until the expandable tubular section expands and contacts the inner walls of the oil pan and the enlarged head seals against said external wall, and removing the draw bolt from the tubular section.

3. The method of claim 2, comprising:

piercing the engine oil pan to provide a rectangular-type hole having four pierced ends extending into said engine oil pan, and scoring said circular chamfered groove around and spaced a predetermined distance from the rectangular-type hole by a fly cutter having a shank end adapted to fit a drill motor and a pilot shank sized to fit and freely rotate in said rectangular-type hole, and a pair of adjustable and removable tool bits to form the chamfered indentation and said oil pan thickness at said base of the chamfered groove being about 5 mils or less.

4. The method of claim 3 comprising:

providing a piercing tool with a cylindrical shield surrounding said punch, and means to move the shield axially relative to the punch, and a spring mounted between a shoulder and the shield to urge the shield to have a normal position which totally surrounds the punch, and providing said punch with an elongated pyramid shape having a pointed apex with four divergent sides diverging from the pointed apex towards a rectangular base.

5. The method of claim 4, comprising:

piercing the engine oil pan to provide said rectangular type hole, and providing a piercing tool with a first end sized to fit an air chisel and a punch retainer end to retain a punch extending therefrom, and cylindrical shield surrounding said punch, and providing means to move the shield axially relative to the punch, and providing a spring mounted between a shoulder and the shield to urge the shield to have a normal position which totally surrounds the punch.

6. The method of claim 5, comprising:

providing said heater bushing with expandable tubular section having an outer diameter of about 0.9 to 1.1 inches and a length of about 0.75 to 1.0 inches extending from and integral with an enlarged head and said expandable section having walls that are about 0.030 to 0.040 inches thick and said expandable section has a circular crimping groove formed about midway along the length of said expandable section, providing said enlarged head with a shoulder adapted to contact an external wall of said engine oil pan surrounding said substantially circular hole, said shoulder having an annular groove, an o-ring seal mounted in said annular groove, inserting a draw bolt through said enlarged head and threading it into the tubular section, continuing the threading until the expandable tubular section expands and contacts the inner walls of the oil pan and the enlarged head is sealed against the outer surface of the oil pan, removing the draw bolt from the tubular section, and inserting the oil heater into the oil pan and attaching the oil pan heater to the enlarged head.

7. A method of installing an oil pan device on a vehicle engine oil pan that is mounted on a vehicle engine and said engine oil pan has an oil pan drain plug comprising draining oil from the engine oil pan, piercing the engine oil pan to provide a pilot hole having pierced ends extending into said engine oil pan, scoring a circular chamfered groove surrounding the pilot hole, inserting a pull means into said oil pan through said pilot hole to engage an internal portion of the oil pan surrounding said pilot hole, pulling said pull means to extract a circular slug from said oil pan and forming a substantially circular hole in said oil pan, inserting an expandable device bushing in said substantially circular hole, said device bushing having an expandable tubular section extending from an enlarged head, crimping said expandable tubular section and sealing the enlarged head to the oil pan, and attaching the oil pan device to the enlarged head.

8. The method of claim 7 comprising:

piercing the engine oil pan by a piercing tool having a first end sized to act with means to actuate the piercing tool, a second end adapted to have a metal punch extending therefrom, providing a non-expandable tubular section extending from said expandable tubular section and having internal threads adjacent a distal end, providing said expandable tubular section with walls thinner than said non-expandable section, providing said enlarged head with attaching means to accept the oil pan device and said enlarged head having an opening with a diameter larger than the diameter of said non-expandable tubular section, said enlarged head having a shoulder adapted to contact an external wall of said engine oil pan surrounding said substantially circular hole, providing seal means to seal said enlarged head to said external wall, inserting a draw bolt through said enlarged head and threading it into the non-expandable tubular section, continuing the threading until the expandable tubular section expands and contacts the inner walls of the oil pan and the enlarged head seals against said external wall, and removing the draw bolt from the tubular section.

9. The method of claim 8, comprising:

piercing the engine oil pan to provide a rectangular-type hole having four pierced ends extending into said engine oil pan, and scoring said circular chamfered groove around and spaced a predetermined distance from the rectangular-type hole by a fly cutter having a shank end adapted to fit a drill motor and a pilot shank sized to fit and freely rotate in said rectangular-type hole, and a pair of adjustable and removable tool bits to form the chamfered indentation and said oil pan thickness at said base of the chamfered groove being about 5 mils or less.

10. The method of claim 9 comprising:

providing a piercing tool with a cylindrical shield surrounding said punch, and means to move the shield axially relative to the punch, and a spring mounted between a shoulder and the shield to urge the shield to have a normal position which totally surrounds the punch, and providing said punch with an elongated pyramid shape having a pointed apex with four divergent sides diverging from the pointed apex towards a rectangular base.

* * * * *